Figure 1:
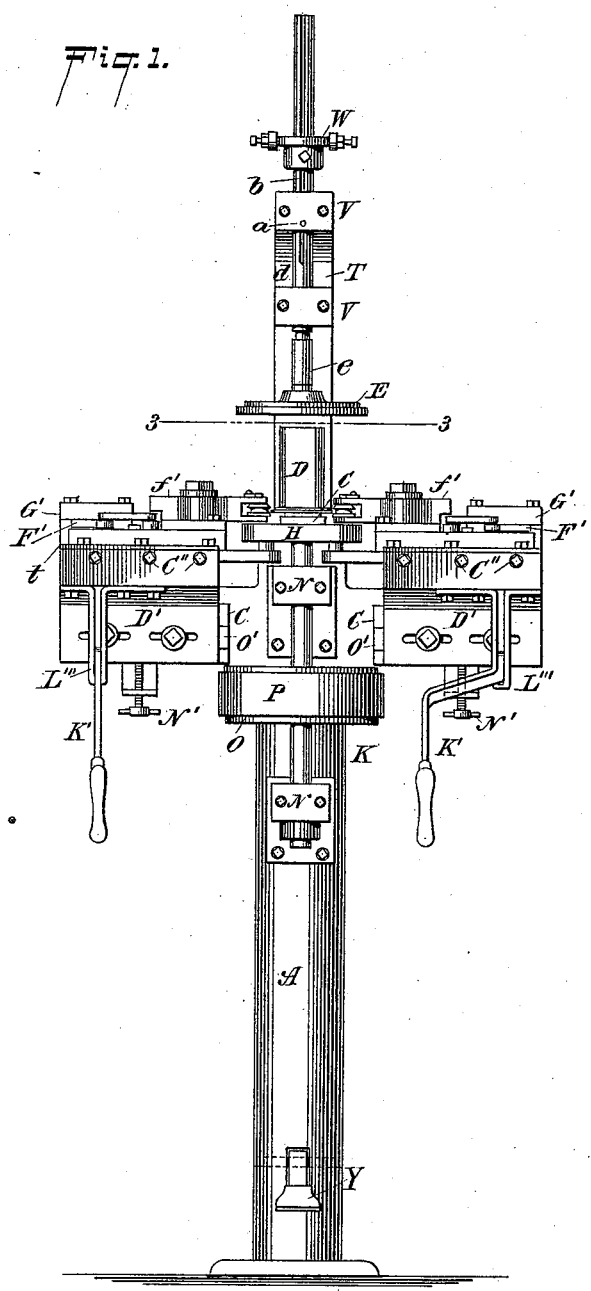

(No Model.) 5 Sheets—Sheet 1.

W. HIPPERLING.
MACHINE FOR MANUFACTURING TIN CANS.

No. 488,674. Patented Dec. 27, 1892.

WITNESSES:
William Goebel.
Ed. D. Miller.

INVENTOR
William Hipperling
BY
Chas. C. Gill
ATTORNEY.

(No Model.) 5 Sheets—Sheet 2.
W. HIPPERLING.
MACHINE FOR MANUFACTURING TIN CANS.

No. 488,674. Patented Dec. 27, 1892.

WITNESSES:
William Goebel.
Ed. D. Miller.

INVENTOR
William Hipperling,
BY
Chas. C. Gill
ATTORNEY.

(No Model.) 5 Sheets—Sheet 3.
W. HIPPERLING.
MACHINE FOR MANUFACTURING TIN CANS.

No. 488,674. Patented Dec. 27, 1892.

WITNESSES:
William Goebel.
Ed. D. Miller.

INVENTOR
William Hipperling.
BY
Chas. O. Gill
ATTORNEY.

(No Model.) 5 Sheets—Sheet 4.

W. HIPPERLING.
MACHINE FOR MANUFACTURING TIN CANS.

No. 488,674. Patented Dec. 27, 1892.

WITNESSES:
William Goebel.
Ed. D. Miller.

INVENTOR
William Hipperling
BY
Chas. C. Gill
ATTORNEY.

(No Model.) 5 Sheets—Sheet 5.
W. HIPPERLING.
MACHINE FOR MANUFACTURING TIN CANS.
No. 488,674. Patented Dec. 27, 1892.
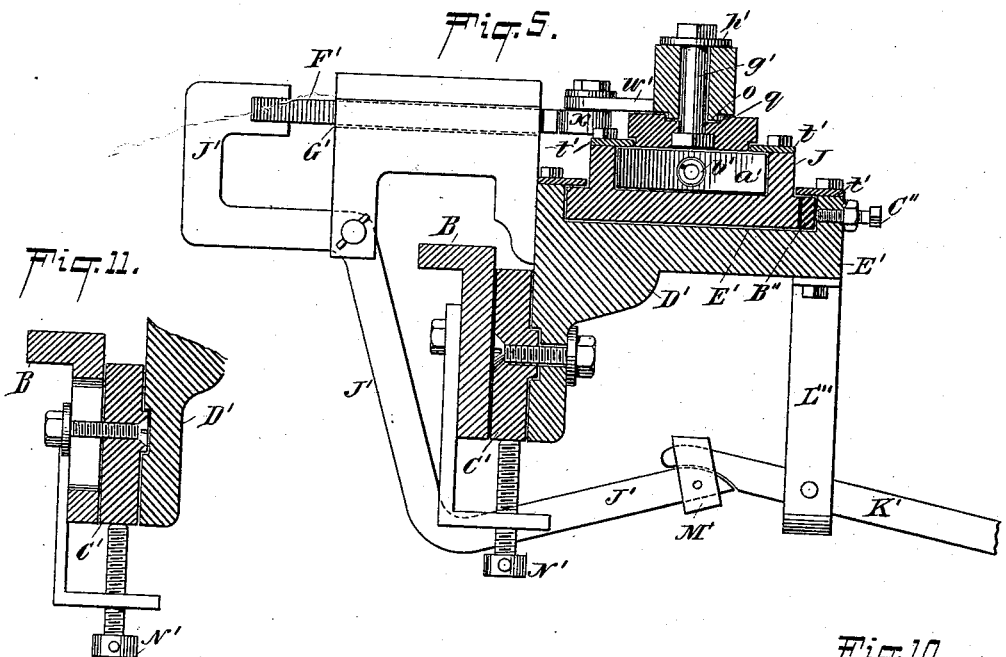
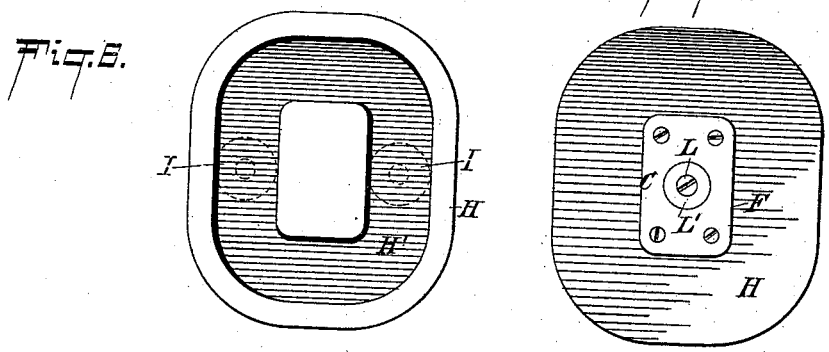
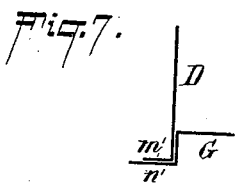
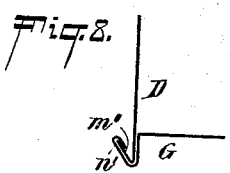
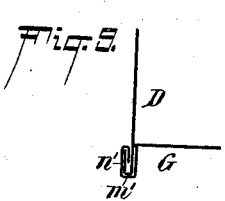
WITNESSES:
William Goebel.
Ed. D. Miller.
INVENTOR
William Hipperling
BY
Chas. C. Gill
ATTORNEY.

UNITED STATES PATENT OFFICE.

WILLIAM HIPPERLING, OF NEW YORK, N. Y., ASSIGNOR TO STEPHEN A. GINNA, OF PLAINFIELD, NEW JERSEY, AND RICHARD A. DONALDSON, OF BROOKLYN, NEW YORK.

MACHINE FOR MANUFACTURING TIN CANS.

SPECIFICATION forming part of Letters Patent No. 488,674, dated December 27, 1892.

Application filed March 29, 1892. Serial No. 426,886. (No model.)

*To all whom it may concern:*

Be it known that I, WILLIAM HIPPERLING, a citizen of the United States, and a resident of New York, in the county of New York and State of New York, have invented certain new and useful Improvements in Machines for the Manufacture of Tin Cans, of which the following is a specification.

The invention relates to improvements in machines for the manufacture of tin cans, and particularly to a machine for seaming the end or ends on the body of the cans whether the latter in cross section be round, square or of other form.

The essential features of the seaming machine made the subject hereof consist of a revolving platen and plate between which the can to be treated is clamped, a movable carriage in contact with and actuated by a revolving cam, and a seaming device sustained by said carriage, said platen and cam conforming in outline with the can in cross section.

In the preferred embodiment of the invention for a machine for double seaming the end or ends in a tin can, the essential features will consist of the revolving platen and plate between which the can is clamped, an actuating cam beneath and conforming in general outline with the platen, a movable carriage at each side of said platen and subject to the action of said cam, and seaming rollers sustained by said movable carriages and adapted by their separate contact with the edge of the can to perform the two operations usual for double-seaming.

The invention consists further in the novel construction and combinations of parts hereinafter fully described and pointed out in the claims.

Figure 2:
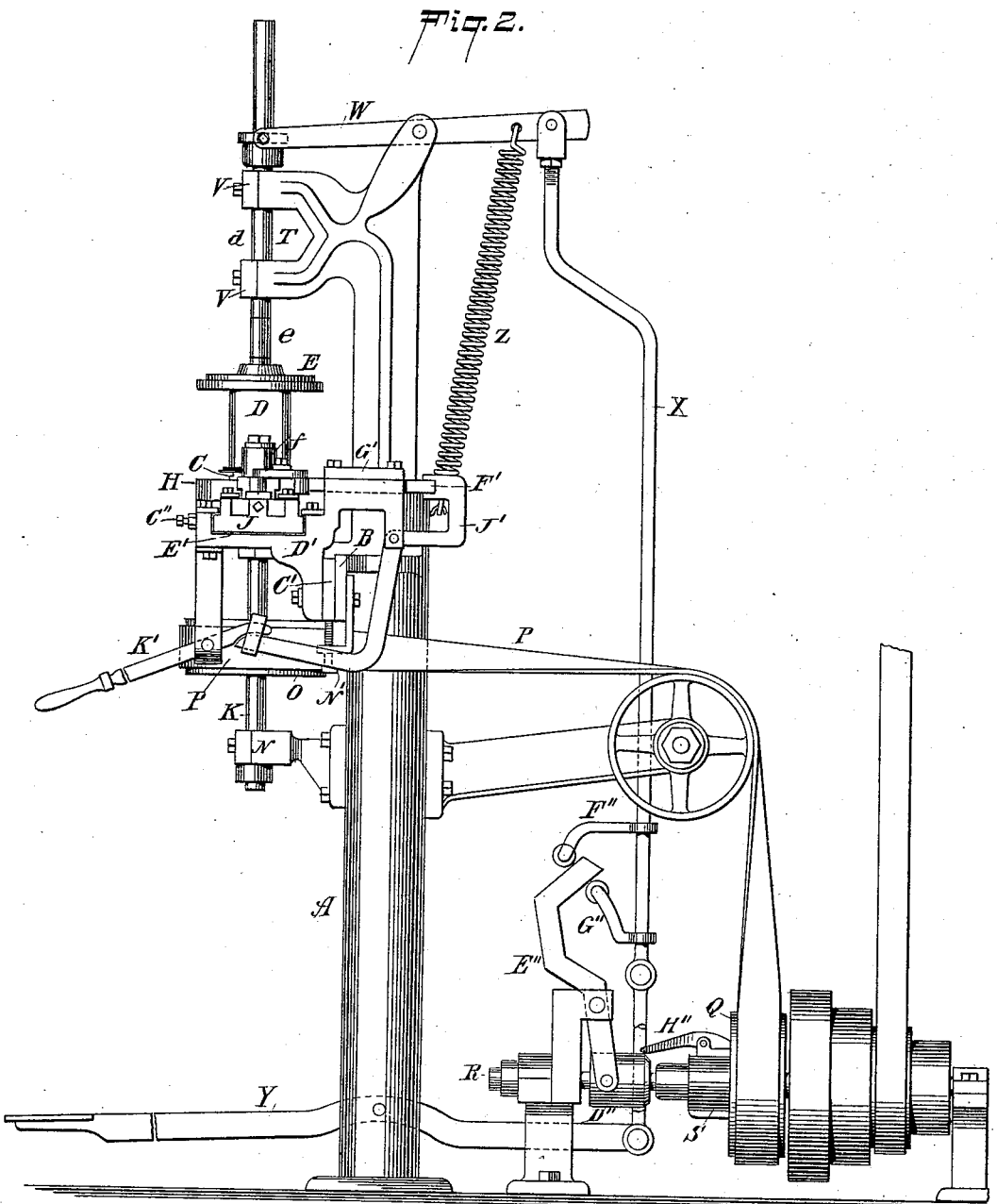
Figure 3:
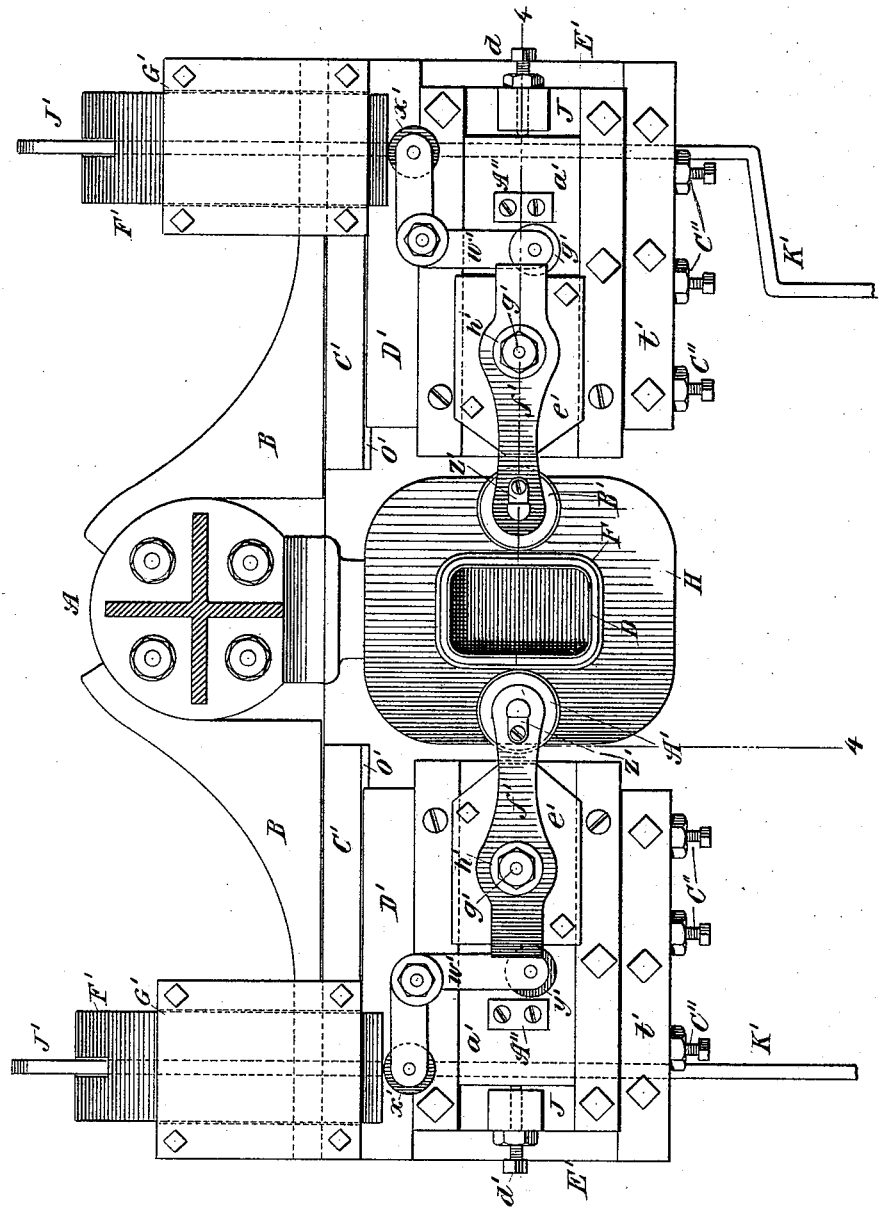
Figure 4:
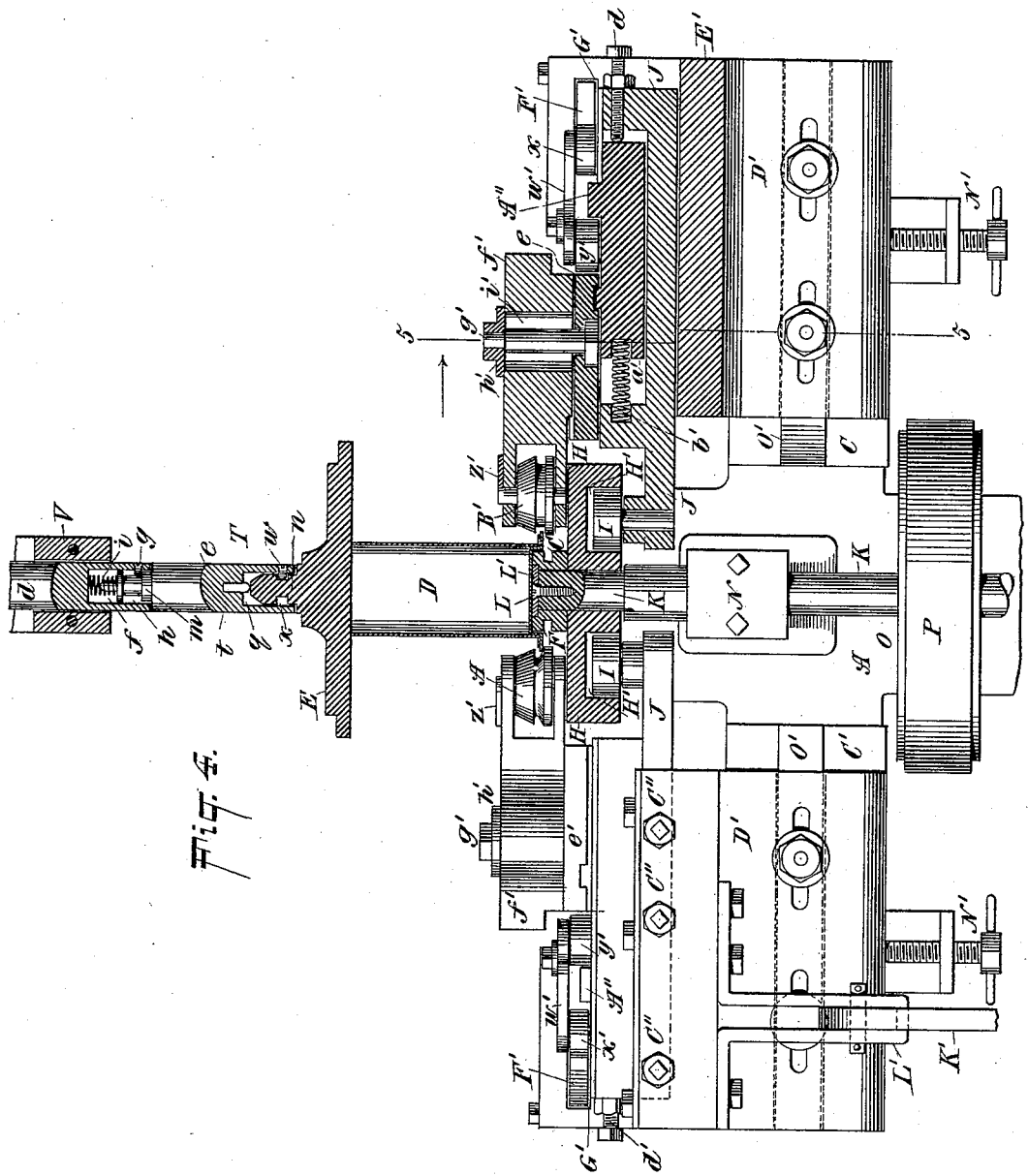

Referring to the accompanying drawings, Figure 1 is a front view of a double seaming machine constructed in accordance with the invention; Fig. 2 a side elevation of same; Fig. 3 an enlarged top view of the bed of the machine, the mechanism carried thereby and the platen, while the upper part of the machine is removed on the section line 3—3 of Fig. 1; Fig. 4 an enlarged detached front elevation of same, partly in longitudinal section on the dotted line 4—4 of Fig. 3; Fig. 5 a detached vertical transverse section on the dotted line 5—5 of Fig. 4; Figs. 6 and 10 are respectively a detached face view of the lower side and a top view of the actuating cam, and Figs. 7, 8 and 9 are diagrams showing respectively the relative positions of the end and body of the can before submission to the machine, after the submission of the can to the first operation of the seaming machine and after the submission of same to the second operation of said machine, the latter operation completing the double seam.

In the drawings A designates the supporting standard or frame of the machine, and B, B, transverse arms or bed extending therefrom and supporting the frames which sustain the seaming devices, as hereinafter described.

The revolving platen is designated by the letter C and the plate clamping the can D against the platen by the letter E. The platen C around its upper portion constitutes a shoulder F fitting the recess G in the end of the can and forming a surface against which the seam of the can is formed and pressed; and upon the lower side of said platen is secured the cam H which receives it in its groove H' the rollers I connected with the slides J and through said rollers actuates said slides. The cam H corresponds in outline with the platen C and with can body in cross section. The platen C and cam H are secured upon the upper end of a vertical shaft K and revolve therewith; the platen and cam are keyed upon said shaft and are further secured by a screw L passing downward through the platen and washer L' into the upper end of the said shaft. The washer L' is countersunk into and has a bearing upon the platen C and aids the screws M in securing the platen and cam H together. The shaft K is mounted in suitable bearings N and carries the band wheel O by which motion is imparted to said shaft from the belt P and wheel Q, the latter being mounted on the driving shaft R having suitable clutch mechanism S of any convenient construction, as shown in Fig. 2, by which the motion may be applied to and cut off from the machine at will. The plate E is revolubly secured to the lower end of the spindle T, mounted and adapted to have a definite vertical movement in the bearings V; and said spindle T is pivotally secured to the front end of the locking lever W, as shown in Fig. 2, while the rear end of said lever is pivotally secured to the upper end of the rod X connected with the foot treadle Y. The rear end of the lever W is also connected with the spring Z which exerts a downward tension thereon and serves to keep the spindle T and plate E in their upward position above the can D (see Fig. 1) except at such times as the pressure of the foot on the treadle Y overcomes the force of the spring Z and through the rod X moves the rear end of the lever W upward and drives down the plate E upon the can body to clamp it on the platen C preparatory to the seaming operation. The spindle T has no rotary movement but simply a vertical reciprocation and in this it is guided by the bearings V and the pin $a$ whose point enters the vertical groove $b$ cut in said spindle. The spindle T is composed of sections $d$, $e$, the upper end of the latter entering and having a limited vertical movement in a socket $f$ formed in the lower end of the former and being held in said socket by a pin $g$ whose point enters the groove $h$ in the end of the section $e$. The socket $f$ contains a spring $i$ which exerts a downward pressure on the section $e$ and keeps the shoulder $m$ on the section $e$ from contact with lower end of the section $d$ as shown in Fig. 1, except at such times as the pressure on the treadle Y is sufficient to overcome the force of the spring $i$ and drive the section $d$ firmly down upon the section $e$ and the plate E upon the can body. The object of the spring $i$ is to form a cushion intermediate the treadle Y and plate E which during the operation of the machine will momentarily prevent the too sudden rotation of the can D until the hand which placed it on the platen C is withdrawn. When the can D is placed on the platen C and the plate E is lowered on the can, the pressure of said plate will momentarily at first be just sufficient to hold the can in position and permit the operator to withdraw his hand, but the pressure on the treadle Y continuing the section $d$ will quickly be driven on the section $e$ as shown in Fig. 2, thus firmly clamping the can, and at this second operation, the clutch S engages and the platen C and plate E with the can D between them rapidly revolve bringing the flanges on the can into contact with the seaming rollers, as hereinafter more fully explained. The plate E has a hardened stud $n$ upon the center of its upper surface and entering the socket $q$ formed in the lower end of the spindle T, and said stud at its upper end forms a bearing for the hardened point $t$, secured to the spindle T. The point $t$ and upper end of the stud $n$ form the contact bearing on which the plate E revolves, and said stud is held in its socket $q$ during the rotation of the plate E by means of the screw $w$ whose point enters the annular groove $x$. The plate E may thus be rotated, without the spindle T having any but a vertical reciprocating movement.

The arms B, B, correspond with each other, and each carries the mechanism for one of the seaming rollers, A′, B′. The mechanism for the roller A′ forms one side of the machine, and corresponds with the mechanism for the roller B′ and constituting the other side of the machine. Upon the vertical face of each arm B is bolted a plate C′ and to said plate is bolted an irregular shaped frame D′, in the upper surface of which is formed the longitudinal guide-bed E′, for the slide J and the transverse guide G′ for the slide F′. The frame D′ at each side of the machine also forms a fulcrum for the angular lever J′; whose upper end engages the rear end of the slide F′ and whose lower end is in contact with and adapted to be moved by the hand lever K′ pivoted in the hanger L′′′. The lower end of the lever J′ carries the loop M′, which loosely encompasses the end of the lever K′ and preserves its contact with the lever J′. The holes in the plates C′ for the bolts securing them to the arms B, B, should be elongated vertically in order that by means of screws N′ said plates with the frames D′ and the seaming devices carried by them may be adjusted vertically to suit the particular cans being seamed; and the bolt holes in the frames D′, D′, for the bolts securing them to the plates C′ should be elongated horizontally in order to permit the adjustment of said frames toward or from the cam H and platen C according to the diameter of the cans to be treated, as shown in Fig. 4. The plates C′ are provided with the ribs O′ to enter corresponding grooves in and guide the frames D′, D′, in their horizontal adjustment, and like ribs vertically arranged may be provided on the face of the arms, B, B, to direct the plates C′, C′, in their vertical adjustment under the action of the set screws N′.

The slides J in the guide beds E′ carry at their inner facing ends the rollers I which engage the cam H, and said slides are hollow in their upper portion and contain the blocks $a'$ and springs $b'$, the tension of the latter and their outward pressure on the blocks $a'$ being regulated by the adjusting screws $d'$ passing through the outer ends of the slides J. The blocks $a'$ and slides J carry upon their upper surface the plates $e'$ and chucks $f'$ said plates and chucks being secured together by the bolts $g'$ and nuts $h'$. The bolts $g'$ at their lower ends carry heads which are countersunk into the lower surface of the plates $e'$, and said bolts extend upward through elongated slots $i'$ in the chucks $f'$, the purpose of the said elongated slots being to permit the horizontal adjustment of the checks toward or from the platen C in accordance with the size of the cans under treatment. The chucks $f'$ at their inner or facing ends carry upon vertical axles the seaming rollers A', B', which are of usual form, the roller A' having an annular groove adapted to perform the first operation (shown in Fig. 8) of double seaming, and the roller B' having an annular groove adapted to accomplish the second operation (shown in Fig. 9) of double-seaming. The annular grooves in the seaming rollers A', B', are adapted to receive the flanges $m'$, $n'$, on the can body and end thereof, and by their separate contact therewith to fold them into the double seam in a well known manner. The rollers A', B' turn freely upon their axles and the latter are prevented from rotation by the small plates $z'$ engaging shoulders thereon, as shown in Figs. 3 and 4. The lower surface of the chucks $f'$ are provided with longitudinal ribs $o'$ which enter corresponding grooves $q'$ in the upper face of the plates $e'$ and thereby direct the said chucks in their adjustment toward and from the platen C. The plates $e'$ are guided in their longitudinal reciprocation by the guides $t'$, as shown in Fig. 5.

Upon the frames D', D', are secured upon vertical bolts the bell-crank levers $w'$, whose arms carry rollers, $x'$, $y'$, in contact respectively with the front and of the slides F' and the outer ends of the plates $e'$, as shown more clearly in Figs. 3 and 4. The rollers $y'$ are confined between the outer ends of the plates $e'$ and the shoulders A'' formed on or secured to the blocks $a'$, in order that when said rollers $y'$ are forced inward they will move the said blocks with the chucks $f'$ and seaming rollers, inward against the can, and that when the inward pressure is released from said rollers $y'$ the springs $b'$ may move the said blocks and chucks outward, thus relieving the seaming rolls from contact with the can.

In the guide-beds E' between the front vertical walls thereof and the vertical edge of the slides J are placed the narrow metal strips or gibs B'', as shown in Fig. 5 which under the pressure of the screws C'' preserve a sufficiently firm contact against said slides to prevent lateral play therein during their longitudinal reciprocation; and as the slides J wear the gibs B'' are set closer inward by the screws C'' to compensate therefor.

In the operation of the machine above described the can D with its end inserted, as shown in Fig. 7, is placed on the platen C and there firmly secured by the plate E, which will be depressed upon the can by the pressure of the foot of the operator upon the treadle Y. The movement of the treadle Y to clamp the can also sets the clutch S and hence through the belt P wheel O and shaft K the cam H, platen C, cam D and plate E will be given a rapid revolution. The next step in the operation of the machine will be the partial seaming of the flanges $m'$, $n'$, of the can, and this is accomplished by pulling upward on the lever K', at the left hand side of the machine, and causing thereby the adjacent angular lever J' and slide F' to turn the bell-crank lever $w'$ and force the slide J, plate $e'$ and chuck $f'$ at the left hand side of the machine inward toward the can, thus bringing the annular groove in the seaming roller A' into direct contact with the flanges $m'$ $n'$, which as the can rotates against said roller A' are gradually folded to the position shown in Fig. 8. The lever K' is held upward until the roller A' has completed its operation, thus during the same maintaining the pressure on the flanges $m'$, $n'$. After the roller A' has completed its work, the lever K', at the left hand side of the machine is released, and the force of the spring $b'$ for the left hand side of the machine will return the slide J, plate $e'$, chuck $f'$ and roller A' to their outward position the roller A' being thus relieved from the can. The following step in the operation of the machine is to complete the double-seam by folding and pressing the flanges $m'$, $n'$, into the condition shown in Fig. 9, and this is accomplished by pulling upward on the lever K' at the right hand side of the machine for the purpose, through the adjacent angular lever J', slide F' and bell-crank lever $w'$ of moving the slide J, plate $e'$ and chuck $f'$ inward toward the can, and bringing the annular groove in the seaming roller B' into direct contact with the flanges $m'$, $n'$. The seaming roller B' is held at its inward position until the seam has been completed, whereupon the lever K' will be released, the spring $b'$ move the chuck $f'$ and connecting devices outward, and the foot of the operator will release the treadle, the latter act cutting off the motion of the driving shaft R and permitting the spring Z to elevate the plate E. The can D with the end double-seamed in it is then removed and another can placed on the platen C for treatment when the operation above described will be repeated. The pressure on the foot treadle Y serves to clamp the can and set the cam H, platen C, can D and plate E in motion, and then the first step of the seaming operation is effected by pulling upward on the lever K' at the left hand side of the machine, and the second step of the seaming is accomplished by pulling upward on the lever K' at the right hand side of the machine. During the rotation of the platen C, can D and plate E, the cam H owing to its groove H' conforming to the outline of the can in cross-section, moves the slides J toward and from the axis of the platen and thus permits the seaming rollers A', B', to closely follow against the flanges $m'$, $n'$ with a uniform pressure both at the sides and corners of the can, whether the latter be rectangular or of other form.

The invention is not limited to the special mechanism shown in Fig. 2 for applying or cutting off the motion of the driving shaft by the action of the treadle Y, but in said figure is illustrated a convenient mechanism for this purpose, and, as shown, on the shaft R is placed a sliding sleeve D'' connected with a pivoted lever E″ whose upper end is between the arms F‴, G″, secured to the connecting rod X and adapted on the reciprocation of said rod to rock said lever E″ and move the sleeve D″ on the shaft R. When the treadle is depressed, the sleeve D″ will move under the end of the clutch-lever H″ and key the wheel Q to the shaft R, thus permitting the wheel Q to receive motion from the shaft, and when the treadle Y is released the spring Z will depress the rod X and the arm F‴ and lever E″ will move the sleeve D″ outward and free the clutch-lever H″ and thus permit the wheel Q to rest idly on the shaft R.

I do not limit the invention in every instance to the employment of the duplicate devices at opposite sides of the platen C, since the devices at one side thereof perform a definite seaming or crimping operation when used in connection with the cam H, platen C and plate E; neither do I confine the invention to the particular form of seaming rollers A′, B′, nor in every instance to the particular slides or carriages which sustain said rollers A′, B′, and permit them to approach or recede from the can D.

What I claim as my invention and desire to secure by Letters Patent is:—

1. In a can seaming machine, the revolving platen and plate between which the can is held, said platen conforming in outline with that of the can in cross section, combined with the cam conforming with the platen and having the continuous groove, a movable slide at each side of said platen, and having rollers held within said groove, seaming devices sustained by said slides, the independent hand levers and intermediate mechanism, whereby first one seaming device and then the other may be moved into contact with the can; substantially as and for the purposes set forth.

2. In a can seaming machine, the revolving platen and plate clamping the can, said platen conforming in outline with that of the can in cross-section, combined with the cam conforming with the platen and having the continuous groove, the slide having the roller held in said groove, the chuck sustained by said slide, and having a spring tension outward from the platen and carrying the seaming device, and mechanism for moving said chuck toward said platen; substantially as and for the purposes set forth.

3. In a can seaming machine the revolving platen and plate clamping the can, said platen conforming in outline with the can in cross section, combined with the cam conforming with the platen and having the continuous groove, the slides having rollers held in said groove, the chucks sustained by said slides and having a spring tension outward from the platen and carrying seaming rollers, and mechanism for moving said chucks toward said platen, substantially as and for the purposes set forth.

4. In a can seaming machine, the revolving platen and plate clamping the can, said platen conforming in outline with the can in cross section, combined with the cam conforming with the platen and having the continuous groove, the slides having rollers held in said groove, the chucks having a spring tension outwardly sustained by said slides, and carrying the seaming rollers, the bell crank levers, and the independent hand levers for causing said bell crank levers to move first one chuck and then the other toward said platen, substantially as and for the purposes set forth.

5. In a can-seaming machine the revolving platen and plate between which the can is held, said platen conforming in outline to that of the can in cross-section, combined with the cam centered and conforming with the said platen, the slide engaging said cam, the seaming device sustained by said slide, the bell crank lever engaging said slide, and the hand lever adapted to actuate said bell-crank lever and slide; substantially as set forth.

Signed at New York, in the county of New York and State of New York, this 28th day of March, A. D. 1892.

WILLIAM HIPPERLING.

Witnesses:
 CHAS. C. GILL,
 ED. D. MILLER.